Figure 1:
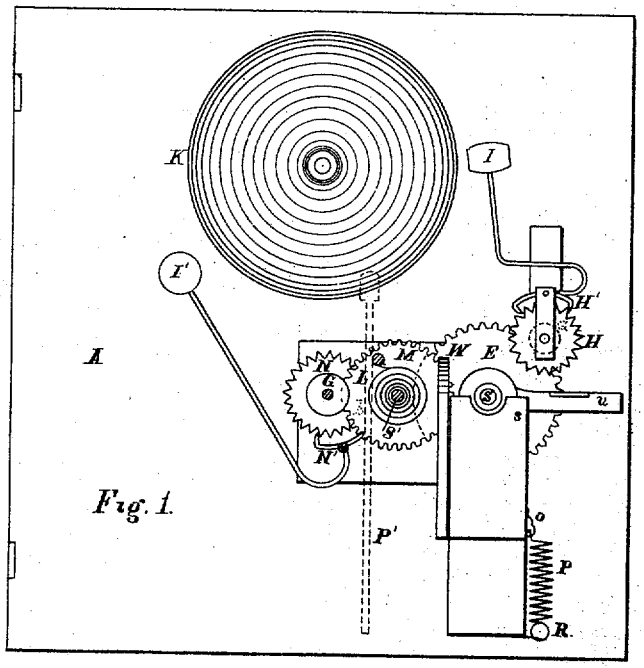

R. N. TOOKER. 2 Sheets—Sheet 1.

Fire-Alarm Signal-Boxes.

No. 8,267. Reissued May 28, 1878.

*Witnesses:*

Forde R. Smith

Silas W. Moody

*Inventor:*

Robert N. Tooker by Munday, Evarts & Adcock his Attorneys

R. N. TOOKER.
Fire-Alarm Signal-Boxes.
No. 8,267. Reissued May 28, 1878.
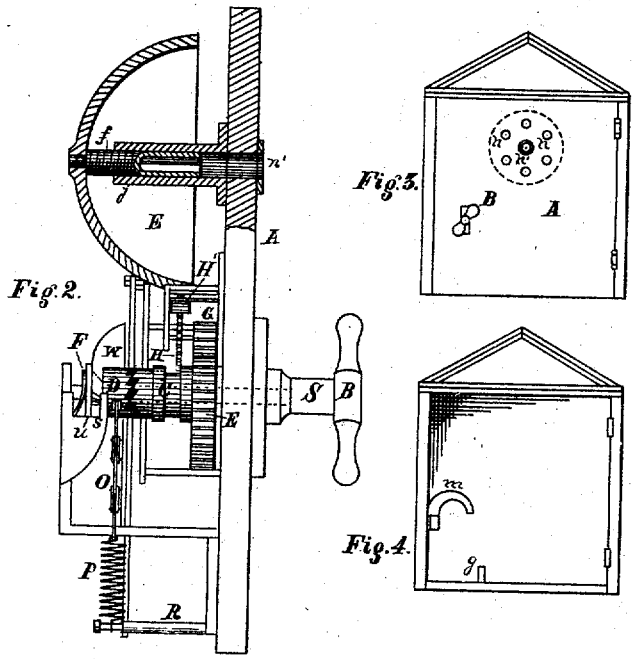
Witnesses:
Forde R. Smith
Silas W. Moody
Inventor:
Robert N. Tooker
by Munday & Evarts
his Attorneys

UNITED STATES PATENT OFFICE.

ROBERT N. TOOKER, OF CHICAGO, ILLINOIS.

IMPROVEMENT IN FIRE-ALARM SIGNAL-BOXES.

Specification forming part of Letters Patent No. 164,406, dated June 15, 1875; Reissue No. 8,267, dated May 28, 1878; application filed April 20, 1878.

*To all whom it may concern:*

Be it known that I, ROBERT N. TOOKER, of Chicago, in the county of Cook and State of Illinois, have invented certain Improvements in Fire-Alarm Signal-Boxes, of which the following is a specification:

Fire-alarm signal-boxes, as now usually constructed, can only be opened by appropriate keys, which are carried by patrolling policemen, or deposited in some building near by, the building, in the latter case, being designated by a sign placed upon or adjacent to the box. Hence, any one, other than a custodian of a key must, before he can give an alarm, look up one of those instruments. Much time is apt to be lost in this search by such contingencies as the absence of the inmates of the building where the key is kept, or the loss or misplacing of the key, and from other causes not necessary to be enumerated here.

It is estimated by experienced firemen that upon the average at least five minutes are lost between the breaking out of a fire and the giving of the alarm, and that much of this lost time may be charged to the causes mentioned. What is done during these five minutes in bringing the fire-extinguishing apparatus into play is, of course, of the utmost consequence in determining the extent and duration of the fire, and hence it becomes very desirable to obtain some form of alarm-box which may be opened without a key by any one desiring to give an alarm, but which shall at the same time afford such means for the detection of trifling and malicious persons that they will be deterred from meddling with the same, and so prevent, in a measure, false alarms.

My invention has for its main object the providing of a box which shall possess the qualities just mentioned, and I accomplish it by attaching a gong or bell, which is sounded by mechanism set in motion by turning the handle to unlatch the door, the bell thus acting as a local alarm.

I am aware that a fire-alarm in a locked box has heretofore been provided with a sounding apparatus, whereby the signal sent was made audible to the ear of the sender; but such apparatus did not accomplish the purpose of the invention herein described, because, first, it was in a box locked against all except the holder of a proper key; and, secondly, because the sounding apparatus was intended primarily for the benefit of the operator, and not to attract the attention of others.

Among the minor features of my invention may be mentioned the providing of mechanism whereby, in the turning of the handle in opening the door, power is stored up which is expended in sounding the bell; also, in providing the box with devices by which the sounding mechanism shall be automatically set ready for the next alarm by simply closing the door, and also by which the door shall be automatically latched in the same operation. This will more fully appear from the subjoined description and the accompanying drawings, which are made a part hereof, and in which—

Figure 1 is a front view of the inside of the door of a box to which my improvement is attached. Fig. 2 is a side elevation of the same, with the upper part cut away to show a vertical central section of the bell and the devices by which it is held. Fig. 3 is a front view of the box with the door closed, and Fig. 4 is a front view of the same with the door removed.

Like letters of reference made use of indicate like parts in all the figures.

In said drawings, A represents the door of an alarm-box, and B the handle by which it is opened. This handle is attached to one end of and turns a shaft, S. At the other end of the shaft, and sliding up and turned by it, is a drum, D, one side of which is cut to clutch with the barrel or sleeve C, revolving upon said shaft and carrying the wheel E. A spring, F, is made to encircle the shaft and press the drum against the barrel, so that when moved in one direction it will not fail to engage and carry the latter with it. The wheel E meshes into the pinion G, which imparts its motion so received to the escapement-wheel and pallet H and H′, and thereby actuates the hammer I to sound the bell K. The parts described up to this point are set in motion by the turning of the handle. The position of the pinion G is shown by dotted lines in Fig. 1. Upon the other side of the wheel E, and meshing into it, is another pinion, (not shown in the drawing,) located upon the shaft S′, to which it imparts motion. Located upon the farther end of this shaft, and fastened thereto in such manner that when the shaft revolves to the left it will be wound up, is the spiral spring L. Upon the same shaft, between the pinion and spring, is a wheel, M, which receives its only motion from a click and ratchet, one part of which is attached to the wheel and the other to the shaft, and the construction of which is too familiar to need description here. The wheel M meshes into the pinion G′, carrying the escapement-wheel N and pallet N′, thereby causing the hammer I′ to strike the bell. O is a chain fastened to the drum D, and upholding a spiral spring, P, the latter being held at its lower end by the projecting rod R. In the operation of opening the door this chain is wound upon the drum and the spring distended.

Pivoted upon the shaft S, and carried thereby, is an arm, U. When the shaft is turned a half-revolution, as it must be to open the door, this arm assumes the reverse of the position shown in Fig. 1, striking in its passage the guide W, and lodging under the shoulder *b* of the upright spring P′, (the two latter being shown in Fig. 1 by dotted lines,) where it is held until released, as hereinafter described. When this happens it is forced back to its first position by the tension of the spring P, as are also the shaft and all the parts carried by it. *s* is a stop, whereon the arm rests when in the position shown by the drawing.

In Fig. 3, the apertures *n* in the door are for the purpose of permitting the escape of the sound from the box. The central aperture *n′* is a key-hole, which can be used in setting the bell into or putting it out of position. This bell, it will be noticed by Fig. 2, is held upon a screw, *f*, working in a threaded sleeve, *j*. The outer end of *f* is slotted or recessed, to receive a key from the outside, by which it may be turned, and so forced in or out, as desired, for the purpose of bringing the bell within or placing it beyond the reach of the hammers.

In Fig. 4 the curved projection *m* upon the inside of the box is placed in such position that the arm U will, when the door is closed, be just within its inner line, and so that when the arm is in the position represented by Fig. 1, or in any position between that and its reverse, the projection will serve as a catch, but when its position is completely reversed it will just escape under the point of the projection.

The small lug *g* upon the bottom of the box shown in the same Fig. 4 is so placed that in closing the door the foot of the upright spring P′ will strike against it, and thereby cause the release of the arm, which then returns to its first position, as before mentioned.

The operation of my invention is as follows: The door being closed, a half-revolution to the right is given to the handle, and thereby to the shaft, drum, and arm also, the latter being held by the shoulder upon the spring P′, as before stated. The moment the drum begins to move it clutches with the sleeve C, and forces it and the wheel E in the same direction. The wheel E communicates this motion, by means of the pinion G, to the parts which actuate the hammer I; and hence this hammer begins striking as soon as the handle commences its half-revolution, and continues so doing until the completion of that movement. The wheel E also communicates motion, by means of the pinion upon the shaft S′, to that shaft in such direction that the latter, by its revolutions, winds up the spiral spring L. As soon as the half-revolution of the handle is completed the door is ready to open. The gong, however, will be sounded for some time after by both hammers, which will receive motive power, through the mechanism shown, from said spring L, the recoil of which sets its own shaft in motion in a direction opposite to that received from the turning of the handle. This reverse motion actuates the click and ratchet, by which the wheel M is made to revolve and to carry the parts which give motion to the hammer I′. It also, by means of the wheel E, sets in operation the mechanism by which the other hammer is moved. The length of time during which the hammers will continue striking depends upon the nature and strength of the spring L, and in no wise is influenced by the closing of the door.

The operation which takes place upon the closing of the door is fully apparent from what has already been written.

While I have shown the gong as inside the box, I do not limit myself to that precise construction, as the gong may be placed in any other part, or even upon the outside, without changing in any degree the principle of my invention.

It will be noticed that the projection *m* is so made as to necessitate the half-revolution of the handle in opening the door. The object of this is to prolong the operation of opening the box sufficiently to permit the sounding of an alarm before that operation is completed; and it might be further prolonged without changing the nature of this part of my invention.

Having thus fully described my invention, what I claim as new, and desire to secure by Letters Patent, is—

1. The combination, with a fire-alarm signal-box, of an alarm-bell or its equivalent, located at the box and sounded by mechanism which is set in motion by the operation of the device which allows the box to be opened, substantially as specified.

2. The combination, with the bell or gong, of the handle, the hammer I, and the intervening mechanism by which the motion of the handle is imparted to said hammer, substantially as specified.

3. The combination, with a fire-alarm box, of the handle, the shaft S, the arm U, and the curved catch *m*, substantially as specified.

4. The combination, with a fire-alarm box, of the arm U, the drum D, both being carried by the same shaft, the chain O, spiral spring P, (which is held at its under end,) catch *m*, upright spring P′, provided with the shoulder *b*, and the lug *g*, substantially as specified, whereby the door is automatically latched.

5. The combination, with a fire-alarm signal-box, of the gong K, screw *f*, sleeve *j*, and aperture *n′*, substantially as specified.

6. The combination, with a fire-alarm signal-box, of a local alarm which is sounded by mechanism receiving motion from a spring wound up by the revolution of the handle in opening the door, substantially as set forth.

7. The combination, with a fire-alarm signal-box, of a local alarm which is sounded by mechanism receiving motion from a spring wound up by the revolution of the handle in opening the door, and released as soon as that revolution is completed, substantially as set forth.

8. The combination, with a fire-alarm signal-box, of a local alarm which is sounded by the opening of the door, substantially as specified.

9. In combination with the local alarm mechanism, a spring which is wound up by the handle operated by the person giving the fire-signal, and which expends its power in continuing the alarm after the handle has completed its movement.

10. The combination, with a fire-alarm signal box, the signal-giving mechanism whereof is accessible to the public without keys, of a local alarm so attached thereto or connected therewith as to be necessarily sounded in giving the fire-signal, whereby false alarms are prevented without locking up the signal-giving apparatus.

ROBT. N. TOOKER.

Witnesses:

EDW. S. EVARTS,

JOHN W. MUNDAY.